US011085620B2

(12) United States Patent
Peng (10) Patent No.: US 11,085,620 B2
(45) Date of Patent: Aug. 10, 2021

(54) CARRY-SIGNAL CONTROLLED LED LIGHT WITH LOW POWER CONSUMPTION AND LED LIGHT STRING HAVING THE SAME

(71) Applicant: Semisilicon Technology Corp., New Taipei (TW)

(72) Inventor: Wen-Chi Peng, New Taipei (TW)

(73) Assignee: Semisilicon Technology Corp., New Taipei (TW)

(*) Notice: Subject to any disclaimer, the term of this patent is extended or adjusted under 35 U.S.C. 154(b) by 0 days.

(21) Appl. No.: 16/444,284

(22) Filed: Jun. 18, 2019

(65) Prior Publication Data

US 2020/0355358 A1 Nov. 12, 2020

(30) Foreign Application Priority Data

May 9, 2019 (CN) .......................... 201910384047.5

(51) Int. Cl.
| H05B 45/00 | (2020.01) |
| F21V 23/00 | (2015.01) |
| F21S 4/20  | (2016.01) |
| F21V 23/02 | (2006.01) |

(52) U.S. Cl.
CPC .............. *F21V 23/003* (2013.01); *F21S 4/20* (2016.01); *F21V 23/023* (2013.01); *H05B 45/00* (2020.01)

(58) Field of Classification Search
None
See application file for complete search history.

(56) References Cited

U.S. PATENT DOCUMENTS

| 8,203,320 B2 | 6/2012 | Leman et al. |
| 2016/0066380 A1 | 3/2016 | Wang et al. |

| 2016/0119277 A1* | 4/2016 | Peng | H05B 45/20 |
| | | | 315/185 R |
| 2016/0308358 A1* | 10/2016 | Sean | H05B 45/10 |
| 2016/0330808 A1* | 11/2016 | Brandt | H05B 45/382 |
| 2017/0373603 A1* | 12/2017 | Basso | H02H 7/12 |

FOREIGN PATENT DOCUMENTS

| CN | 103238268 A | 8/2013 |
| CN | 205793546 U | 12/2016 |
| TW | 201204171 A | 1/2012 |
| TW | M450891 U | 4/2013 |
| TW | 201540125 A | 10/2015 |
| TW | 201626853 A | 7/2016 |

OTHER PUBLICATIONS

Office Action issued in corresponding Taiwan patent application No. 108116546 dated Aug. 4, 2020.

* cited by examiner

*Primary Examiner* — Amy Cohen Johnson
*Assistant Examiner* — Jianzi Chen
(74) *Attorney, Agent, or Firm* — Muncy, Geissler, Olds & Lowe, P.C.

(57) ABSTRACT

A carry-signal controlled LED light with low power consumption includes at least one LED and a drive unit. The drive unit is coupled to the at least one LED, and receives a carry light signal to control the at least one LED. The drive unit includes a light control unit. The light control unit drives the at least one LED according to a light command content of the carry light signal. When a voltage of the carry light signal is less than a low-level voltage, the light control unit enters an eco mode, and the light control unit detects and identifies signals within a time interval. After the time interval, the light control unit enters a sleep mode.

17 Claims, 9 Drawing Sheets

CARRY-SIGNAL CONTROLLED LED LIGHT WITH LOW POWER CONSUMPTION AND LED LIGHT STRING HAVING THE SAME

BACKGROUND

Technical Field

The present disclosure relates to an LED light and an LED light string, and more particularly to a carry-signal controlled LED light with low power consumption and an LED light string having the same.

Description of Related Art

The statements in this section merely provide background information related to the present disclosure and do not necessarily constitute prior art.

Since light-emitting diode (LED) has the advantages of high luminous efficiency, low power consumption, long life span, fast response, high reliability, etc., LEDs have been widely used in lighting fixtures or decorative lighting, such as Christmas tree lighting, lighting effects of sport shoes, etc. by connecting light bars or light strings in series, parallel, or series-parallel.

Take the festive light for example. Basically, a complete LED lamp includes an LED light string having a plurality of LEDs and a drive unit for driving the LEDs. The drive unit is electrically connected to the LED light string, and controls the LEDs by a point control manner or a synchronous manner by providing the required power and the control signal having light data to the LEDs, thereby implementing various lighting output effects and changes of the LED lamp.

With the progress of the technology, the carrier manner can be utilized for the control signal having the light data to transmit the light signal through the power line. The functions of providing power and data transmission can be achieved by the same circuit structure to simplify the layout design, reduce the volume of the circuit, and benefit the design of the control circuit.

The drive unit mainly provides a light control signal with a high voltage level and a low voltage level to drive the LED light string. For driving the LED light string, if the LED light string includes more of the numbers of the LED lights in series, since the connection lines connecting the LEDs are thicker and longer, the parasitic capacitance of the LED light string increases so that the speed of the system processing the signals is not fast enough. Thus, the possibility of determining the light signal incorrectly increases. If effectively avoiding the LED light string interpreting/decoding the light control signal incorrectly is required, the speed of the light control signal at the high voltage and low voltage transition has to slow. However, this results that the number of the lights driven by the LED light string is less and/or the speed of changing lights/colors slows.

Figure 1:
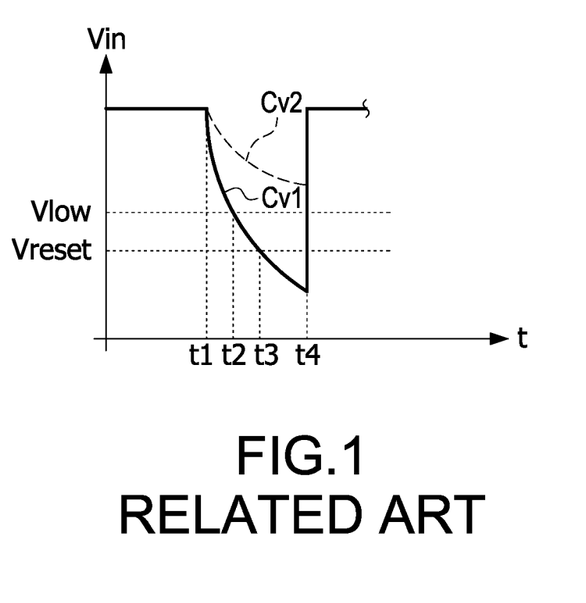
FIG. 1 is a schematic waveform of a light control signal of an LED light string in the related art.

Please refer to FIG. 1, which shows a schematic waveform of a light control signal of an LED light string in the related art. FIG. 1 shows two waveforms of light control signals including a first waveform Cv1 and a second waveform Cv2. The abscissa indicates time t and the ordinate indicates input voltage Vin, and a low-level voltage Vlow and a reset voltage Vreset are labeled. The low-level voltage Vlow means a voltage for identifying a low level of the light control signal, and the reset voltage Vreset means a voltage for resetting the LED. Take the second waveform Cv2 for example, the second waveform Cv2 is the natural discharge of the light control signal. Therefore, the existing problem of the second waveform Cv2 is that when the parasitic capacitance of the circuit is too large, the discharge time is longer, resulting that when entering the next cycle, the second waveform Cv2 still cannot reach the low-level voltage Vlow so that the light control signal cannot be identified as the low level (namely, the light control signal is continuously determined as the high level voltage). At this condition, only increasing the width between two cycles (so the natural discharge is able to reach the low-level voltage Vlow) achieves the identification of the low-level voltage Vlow. However, such control manner is only suitable for less numbers of the LEDs in series in the LED light string (better control effect can just be achieved). In other words, since the complete light control signal cannot be achieved by rapidly discharging, such control manner cannot be suitable for more numbers of the lights (for example, over hundreds of the numbers of the lights) in series. That is, all of the numbers of the lights in series able to receive the complete light control signal cannot be ensured.

Accordingly, a rapid discharge circuit can be utilized to control the light control signal to rapidly reduce the voltage level of the light control signal, or the LED light string having lesser circuit total parasitic capacitance easily reduces the voltage level of the light control signal rapidly, such as the first waveform Cv1 shown in FIG. 1. However, when the light control signal rapidly reduces, the light control signal easily happens that: after the light control signal is lower than the identifiable low-level voltage Vlow (for example, at the time point t2), the light control signal still rapidly reduces so that the light control signal reaches the reset voltage Vreset (for example, at the time point t3) so that the circuit happens unnecessary reset failure, resulting in the abnormal determination and malfunction of the LED module.

The related art utilizes a set of signal voltage generation circuit on the control circuit to clamp the voltage so that the voltage does not reduce to be the reset voltage Vreset. However, eventually the circuits of such related art are complicated. Therefore, the inventor of the present disclosure would like to provide a simple circuit to solve the problem that how to design a carry controlled LED light and the LED light string having the carrier controlled LED light for solving the voltage of the light control signal reaching the reset voltage due to too small parasitic capacitance which results in the abnormal determination and malfunction problems of the LED module.

SUMMARY

An object of the present disclosure is to provide a carry-signal controlled LED light with low power consumption to solve determination abnormality and malfunction of the LED module since the light drive signal reduces to reach to the reset voltage by using simple application circuits.

In order to achieve the above-mentioned object, the carry-signal controlled LED light with low power consumption includes at least one LED and a drive unit. The drive unit is coupled to the at least one LED. The drive unit receives a carry light signal to control the at least one LED. The drive unit includes a light control unit. The light control unit drives the at least one LED according to a light command content of the carry light signal. When a voltage of the carry light signal is less than a low-level voltage, the light control unit enters an eco mode, and the light control unit detects and identifies signals within a time interval. After the time interval, the light control unit enters a sleep mode.

In one embodiment, before entering the sleep mode, the light control unit enters a work mode when the voltage of the carry light signal is greater than the low-level voltage.

In one embodiment, after entering the sleep mode, the light control unit leaves the sleep mode when the voltage of the carry light signal is greater than the low-level voltage.

In one embodiment, the drive unit further includes an oscillator. The oscillator is coupled to the light control unit. In the eco mode, the oscillator receives a control signal, and the oscillator is controlled by the control signal to be in an oscillation operation at low power.

In one embodiment, the drive unit further includes a latch unit and an oscillator. The latch unit is coupled between an input side and an output side inside the LED light. The oscillator is coupled to the light control unit and the latch unit. In the eco mode, the latch unit and the oscillator receive a control signal, and the oscillator is controlled by the control signal to be disabled and the latch unit is controlled by the control signal to be in a timing operation.

In one embodiment, the drive unit further includes a current detection unit. The current detection unit is coupled to the light control unit and produces the control signal.

In one embodiment, the latch unit is a charging and discharging circuit with a resistor and a capacitor.

In one embodiment, the latch unit is a timing circuit.

In one embodiment, the drive unit further includes an address signal process unit. The address signal process unit is coupled to the light control unit and memorizes a light address. The address signal process unit receives an address signal transmitted from the light control unit and compares the address signal with the light address. When the address signal matches the light address, the light control unit drives the at least one LED according to the light command content of the carry light signal.

In one embodiment, the drive unit further includes an address burn unit. The address burn unit is coupled to the address signal process unit. The carry light signal includes a burn start signal and a burn address signal. When the address burn unit receives the burn start signal, the address burn unit writes the light address into the address signal process unit according to a burn command content of the burn address signal.

In one embodiment, the drive unit further includes a discharge unit. The discharge unit is coupled to the current detection unit. When the discharge unit receives the carry light signal transmitted from the current detection unit, the discharge unit starts to discharge a DC working power.

In one embodiment, the drive unit further includes a power capacitor. The power capacitor is coupled to the light control unit, the latch unit, and the at least one LED.

Accordingly, the carry-signal controlled LED light with low power consumption is provided to effectively reduce power consumption of the analogy circuits with relatively high power consumption and to make the LED module normally operate.

Another object of the present disclosure is to provide a carry-signal controlled LED light string to solve determination abnormality and malfunction of the LED module since the light drive signal reduces to reach to the reset voltage by using simple application circuits.

In order to achieve the above-mentioned object, the carry-signal controlled LED light string includes a power line, a controller, and at least one LED light. The controller is coupled to the power line. The LED light is coupled to the controller through the power line, and receives the DC working power and the carry light signal transmitted from the controller through the power line.

In one embodiment, the controller includes a rectifier unit, a switch, and a control unit. The rectifier unit is coupled to the power line and provides the DC working power. The switch is coupled to the power line and the at least one LED light. The control unit is coupled to the rectifier unit and the switch. When the control unit turns on the switch, the DC working power forms a power supply loop for the LED light through the power line. When the control unit produce the carry light signal, the control unit continuously turns on and turns off the switch according to the light command content of the carry light signal so that the DC working power of the power line forms a plurality of a plurality of pulse waves to be combined into the carry light signal, and transmits the carry light signal to the LED light through the power line.

In one embodiment, the controller further includes a discharge circuit. The discharge circuit is coupled to the power line and the control unit. When the switch is turned off, the controller drives the discharge circuit to receive the DC working power and to start discharging the DC working power.

In one embodiment, the controller further includes a voltage adjust capacitor. The voltage adjust capacitor is coupled to the power line. When the switch is turned off, the voltage adjust capacitor provides the DC working power to the at least one LED light.

Accordingly, the carry-signal controlled LED light string is provided to effectively reduce power consumption of the analogy circuits with relatively high power consumption and to make the LED module normally operate.

It is to be understood that both the foregoing general description and the following detailed description are exemplary, and are intended to provide further explanation of the present disclosure as claimed. Other advantages and features of the present disclosure will be apparent from the following description, drawings and claims.

BRIEF DESCRIPTION OF DRAWING

The present disclosure can be more fully understood by reading the following detailed description of the embodiment, with reference made to the accompanying drawings as follows.

DETAILED DESCRIPTION

Reference will now be made to the drawing figures to describe the present disclosure in detail. It will be understood that the drawing figures and exemplified embodiments of present disclosure are not limited to the details thereof.

Figure 2A:
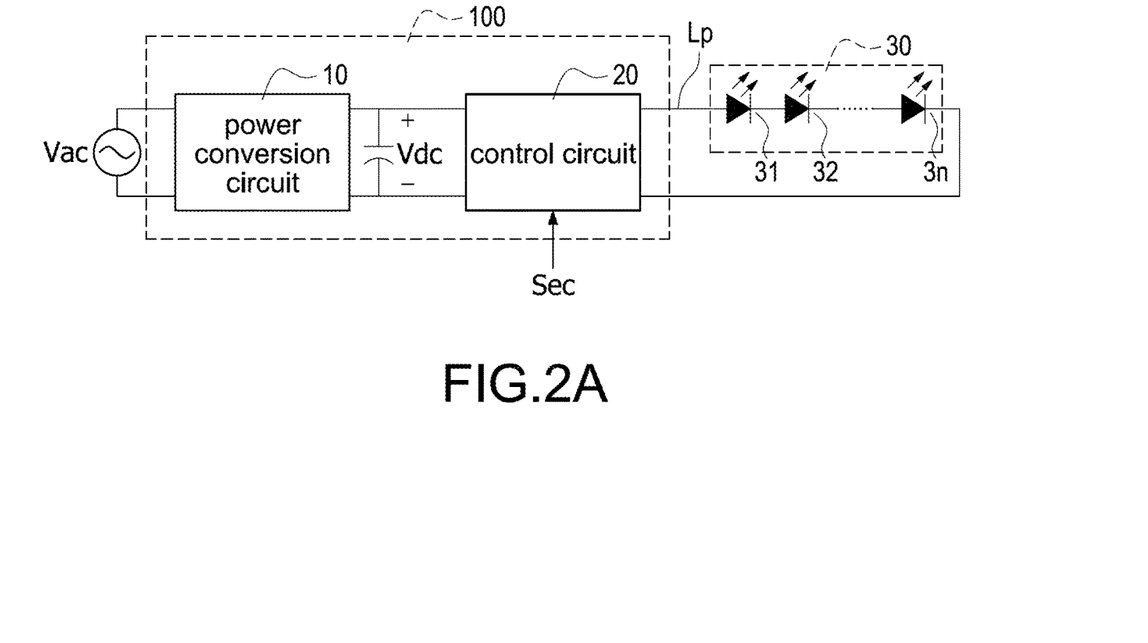
FIG. 2A is a block circuit diagram of a drive system of a carry-signal controlled LED light string according to a first embodiment of the present disclosure.

Please refer to FIG. 2A, which shows a block circuit diagram of a drive system of a carry-signal controlled LED light string according to a first embodiment of the present disclosure. The drive system of the first embodiment includes a power conversion circuit 10, a control circuit 20, and an LED (light-emitting diode) light string 30. The power conversion circuit 10 and the control circuit 20 may be integrated into a controller 100. Specifically, the controller 100 may be implemented by a physical circuit control box including the power conversion circuit 10 and the control circuit 20. The power conversion circuit 10 receives an AC power Vac and converts the AC power Vac into a DC power Vdc. The DC power Vdc is across an output capacitor (not labeled) connected at output terminals of the power conversion circuit 10.

The control circuit 20 receives the DC power Vdc to supply the required DC power for the control circuit 20 and the LED light string 30. The controller 100 is coupled to the AC power Vac and the LED light string 30 through a power line Lp. Broadly speaking, the power line Lp is not limited by the labeled indication in FIG. 2A. As long as the power line can be used as a line for transmitting AC power Vac or the DC power Vdc, it should belong to the power line Lp. For example, an electrical connection between the AC power Vac and the power conversion circuit 10, an electrical connection between the control circuit 20 and an anode terminal of the LED light string 30, or an electrical connection between the control circuit 20 and a cathode terminal of the LED light string 30. In one embodiment, the LED light string 30 includes a plurality of LED modules 31, 32, . . . , 3n (also refer to the LED light). The LED modules 31, 32, . . . , 3n are connected in series and electrically connected to the control circuit 20. In one embodiment, the LED light string 30 is a light string having data burning function, and therefore each of the LED modules 31, 32, . . . , 3n has own digital and analog circuits for burning light data and address data, the detailed description will be made as follows.

The control circuit 20 can receive external light control data Sec through a wired manner or a wireless manner as well as read internal light data stored inside the control circuit 20 so that the control circuit 20 can control each of the LED modules 31, 32, . . . , 3n of the LED light string 30 according to the content of the light control data Sec. For example, the user may operate a computer through the wired manner to transmit the light control data Sec to the control circuit 20 so that the control circuit 20 controls the LED modules 31, 32, . . . , 3n according to the light control data Sec. Alternatively, the user may operate a mobile phone or a wearable device through the wireless manner to transmit the light control data Sec to the control circuit 20 so that the control circuit 20 controls the LED modules 31, 32, . . . , 3n according to the light control data Sec. However, the present disclosure is not limited by the above-mentioned manners of transmitting the light control data Sec and the devices operated by the user.

Figure 2B:
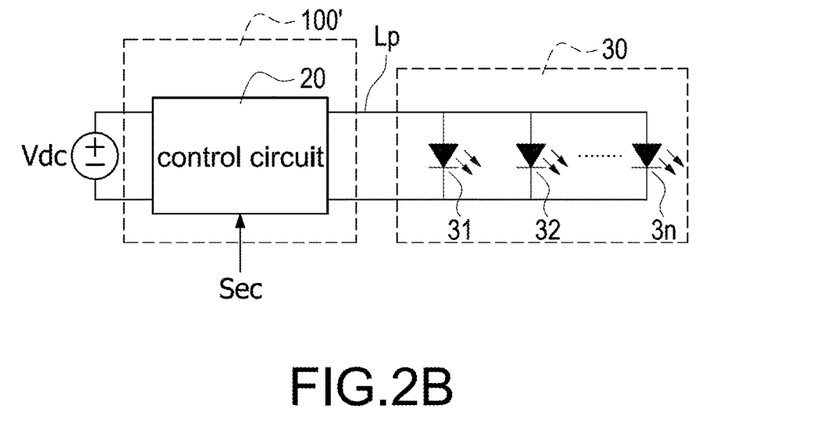
FIG. 2B is a block circuit diagram of the drive system of the carry-signal controlled LED light string according to a second embodiment of the present disclosure.

Please refer to FIG. 2B, which shows a block circuit diagram of the drive system of the carry-signal controlled LED light string according to a second embodiment of the present disclosure. The major difference between the second embodiment and the first embodiment shown in FIG. 2A is that the LED modules 31, 32, . . . , 3n of the LED light string 30 are electrically connected in parallel and electrically connected to the control circuit 20 in the former (i.e., the second embodiment). Therefore, the control circuit 20 and the LED modules 31, 32, . . . , 3n are directly supplied power by a DC power Vdc for example but not limited to a battery unit. In comparison with the first embodiment shown in FIG. 2A, the absence of the power conversion circuit 10 is to omit converting the AC power Vac into the DC power Vdc. Similarly, the LED light string 30 is a light string having data burning function, and therefore each of the LED modules 31, 32, . . . , 3n has own digital and analog circuits for burning light data and address data, the detailed description will be made as follows.

Figure 3A:
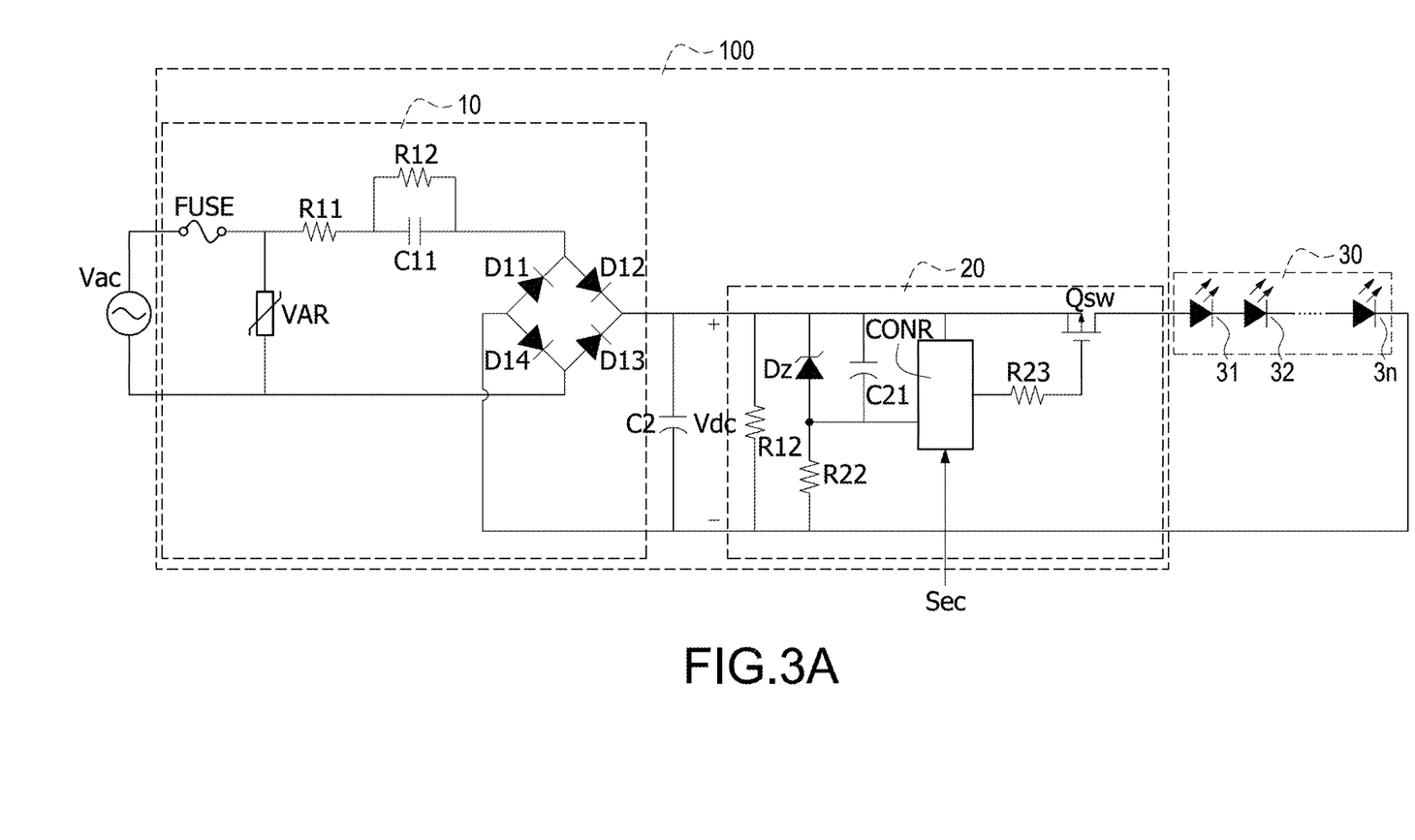
FIG. 3A is a detailed circuit diagram of a power conversion circuit and a control circuit according to a first embodiment in FIG. 2A.
Figure 3B:
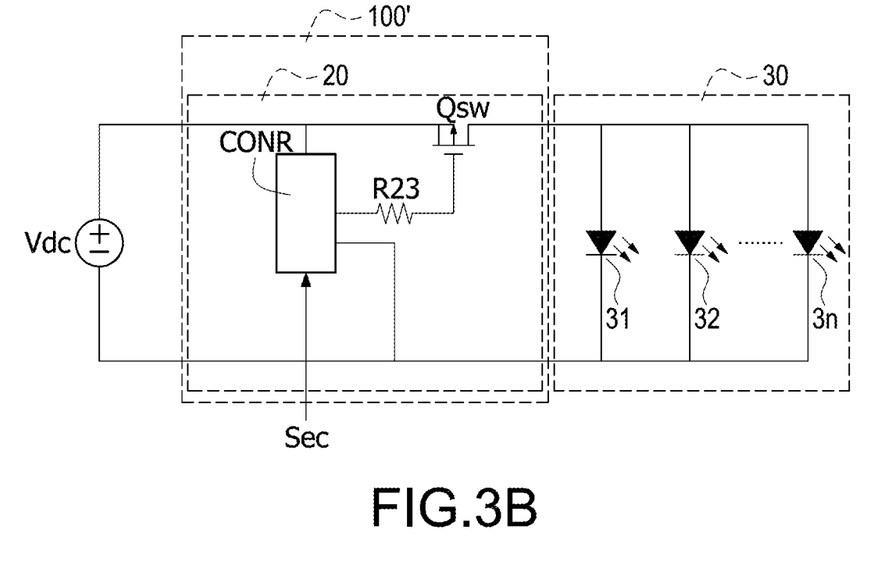
FIG. 3B is a detailed circuit diagram of the power conversion circuit and the control circuit in FIG. 2B.

Please refer to FIG. 3A and FIG. 3B, which show detailed circuit diagrams of a power conversion circuit and a control circuit in FIG. 2A and FIG. 2B, respectively. The power conversion circuit 10 includes a fuse FUSE, a varistor VAR, an input resistor R10, an input capacitor C11 connected to the input resistor R10 in parallel, and a full-bridge rectifier composed of a plurality of diodes D11-D14. The fuse FUSE provides an over-current protection for the power conversion circuit 10, and the varistor VAR provides an over-voltage protection for the power conversion circuit 10. The input resistor R10 and the input capacitor C11 are coupled between the fuse FUSE, the varistor VAR, and the full-bridge rectifier, and excess energy can be absorbed by the input capacitor C11 so as to adjust a total voltage for supplying the LED light string 30. The AC power Vac is rectified into the DC power Vdc by the full-bridge rectifier, and the DC power Vdc is across an output capacitor C2 connected at output terminals of the power conversion circuit 10.

The control circuit 20 includes a control unit CONR, an output control switch Qsw, and a work voltage generation circuit. The control unit CONR is coupled to the output control switch Qsw and the work voltage generation circuit. The output control switch Qsw receives the DC power Vdc and the output control switch Qsw is turned on or turned off by the control unit CONR to connect or disconnect the DC power Vdc to the LED light string 30. In one embodiment, the output control switch Qsw is coupled to an anode terminal of the LED light string 30, and the output control switch Qsw is a p-channel MOSFET and coupled to the control unit CONR through a resistor R23. In another embodiment, the output control switch Qsw may be coupled to a cathode terminal of the LED light string 30, and the output control switch Qsw is an n-channel MOSFET and coupled to the control unit CONR through the resistor R23, and therefore the equivalent characteristics of the circuit can be achieved.

In one embodiment, the work voltage generation circuit includes a resistor R22, a capacitor C21, and a Zener diode Dz. The capacitor C21 is connected in parallel to the Zener diode Dz, and then connected to the resistor R22. The Zener diode Dz receives the DC power Vdc through the resistor R22, and clamps the DC power Vdc in a fixed voltage value for providing the required work voltage to the control unit CONR. The present disclosure is not limited by the architecture of the work voltage generation circuit shown in FIG. 3A, that is, as long as the circuit architecture capable of achieving the function of generating the working voltage should be included in the scope of the present disclosure.

Figure 3C:
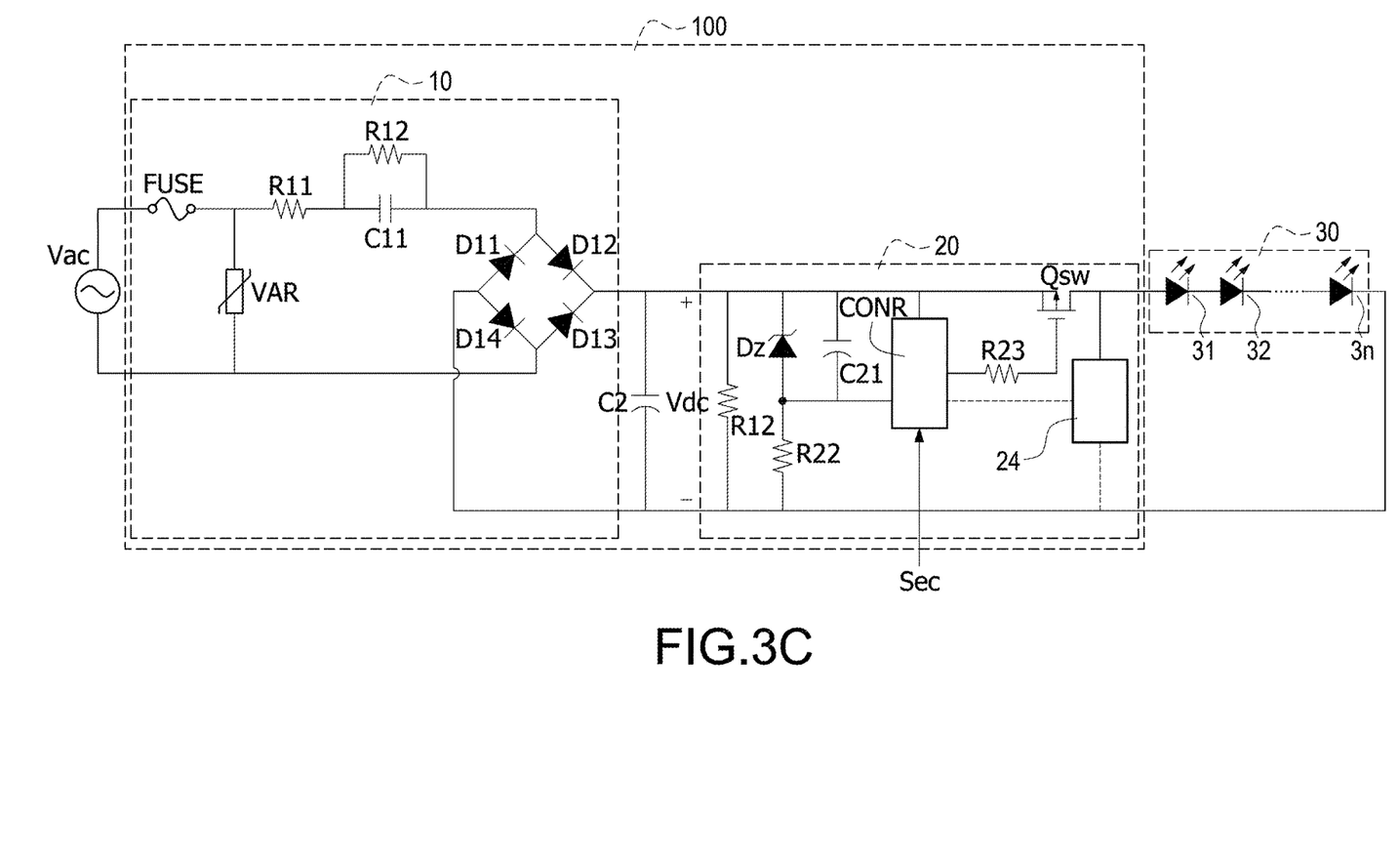
FIG. 3C is a detailed circuit diagram of the power conversion circuit and the control circuit according to a second embodiment in FIG. 2A.

Please refer to FIG. 3C, which shows a detailed circuit diagram of the power conversion circuit and the control circuit according to a second embodiment in FIG. 2A. In comparison with FIG. 3A, the control circuit 20 further includes a voltage adjust unit 24. The voltage adjust unit 24 can be a quick discharge circuit for quickly discharging the DC working power to supply the LED light string 30. Alternatively, the voltage adjust unit 24 is a voltage adjust capacitor for slowly discharging the DC working power to supply the LED light string 30.

If the voltage adjust unit 24 is the voltage adjust capacitor, the voltage adjust unit 24 is coupled in parallel to the LED light string 30 for slowly discharging the DC working power to supply the LED light string 30 according to the capacitance value of the voltage adjust capacitor.

If the voltage adjust unit 24 is the quick discharging circuit, the voltage adjust unit 24 is coupled to the output control switch Qsw, the LED light string 30, and the control unit CONR, and the voltage adjust unit 24 is controlled by the control unit CONR. When the control unit CONR turns off the output control switch Qsw, the control unit CONR controls an output voltage, i.e., a voltage outputted from the LED light string 30 by a discharging manner, or controls the quick discharging circuit (i.e., the voltage adjust unit 24), or controls a quick discharging circuit (not shown) inside each of the LED modules 31, 32, . . . , 3n so as to quickly reduce a voltage of the DC working power outputted to the LED light string 30. The control unit CONR turns on the output control switch Qsw according to the predetermined time to restore (increase) the output voltage outputted to the LED light string 30, and produces a light drive signal according to the received light control data Sec so that the LED light string 30 operates in an illumination mode according to the light drive signal.

On the contrary, if no light drive signal is transmitted to the LED light string 30, the control unit CONR turns on the output control switch Qsw so that the DC power Vdc (i.e., the DC working electricity) supplies power to the LED light string 30 through the output control switch Qsw. Accordingly, as long as the output control switch Qsw is turned off or turned on, the light drive signal and the supplying power can be both transmitted to the LED light string 30 under the same circuit architecture.

Figure 4:
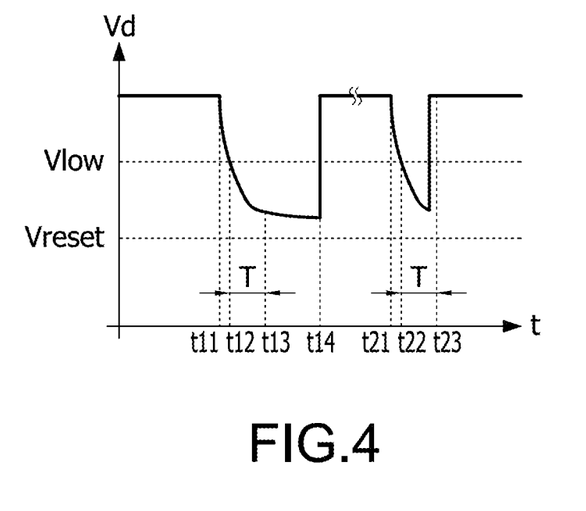
FIG. 4 is a schematic waveform of a light drive signal according to the present disclosure.

Please refer to FIG. 4, which shows a schematic waveform of a light drive signal according to the present disclosure. As mentioned above, when the control unit CONR turns off the output control switch Qsw, the voltage outputted from the LED light string 30 is reduced by the discharging manner so as to provide a low-level voltage of a light drive signal Vd for each of the LED modules 31, 32, . . . , 3n of the LED light string 30. Alternatively, the quick discharging circuit (not shown) inside each of the LED modules 31, 32, . . . , 3n is controlled to quickly reduce the voltage generated from a light signal voltage generation circuit to provide the low-level voltage of the light drive signal Vd for each of the LED modules 31, 32, . . . , 3n of the LED light string 30. In particular, three modes are provided to control the LED modules 31, 32, . . . , 3n in the present disclosure. The first mode is a work mode, the second mode is an eco mode, and the third mode is a sleep mode. Therefore, the LED modules 31, 32, . . . , 3n can normally operate and meet the requirement of low power consumption.

The work mode means that internal circuits, including analog circuits and digital circuits in each of the LED modules 31, 32, . . . , 3n can normally operate. In order to achieve the purpose of low power consumption, the eco mode first operates, and then the sleep mode operates. The purpose of the eco mode is to first turn off (disable) the analog circuits with higher power consumption. The cooperation consideration between the oscillator and the digital circuits is necessary, however, the analog circuits except the oscillator or the analog circuits involving the oscillator are first turned off (disabled) in the eco mode to significantly reduce more power consumption and maintain the normal operation of the digital circuits, and therefore signal detection and signal recognition can normally work. In the eco mode, the oscillator is controlled to be in an oscillation operation at low power without turning off. After the signal detection and signal recognition is completed, the oscillator is turned off to enter the sleep mode. Accordingly, it is to avoid unnecessary reset failure of the circuits to cause determination abnormality and malfunction of the LED module 31 since the light drive signal Vd quickly reduces to reach to the reset voltage Vreset during the quick discharging operation.

Specifically, as shown in FIG. 4, and also refer to FIG. 3A. Before the time point t11, the output control switch Qsw is controlled to be turned on by the control unit CONR, and therefore each of the LED modules 31, 32, . . . , 3n is in the work mode. At the time point t11, the output control switch Qsw is controlled to be turned off by the control unit CONR. At this condition, the light drive signal Vd quickly reduces. At the time point t12, the light drive signal Vd reaches to the low-level voltage Vlow so as to identify that the light drive signal Vd is a proper drive signal for driving the LED modules 31, 32, . . . , 3n (the following description is based on the LED module 31). However, in order to avoid unnecessary reset failure of the circuits to cause determination abnormality and malfunction of the LED module 31 since the light drive signal Vd gradually reduces to reach to the reset voltage Vreset, it is to enter the eco mode at the time point t12. The analog circuits except the oscillator or the analog circuits involving the oscillator are first turned off (disabled) to significantly reduce more power consumption. Moreover, in order to maintain the normal operation of the digital circuits and the oscillator, the signal detection and signal recognition must be completed within a time interval T, and then it is to enter the sleep mode at the time point t13, thereby significantly reducing power consumption of the LED module 31. The time interval T means a time interval between the time point t12 and the time point t13, for example but not limited to, a time length of several (3 or 4) clock cycles. Therefore, after the time point t13, the oscillator is completely turned off so that the power consumption of the LED module 31 is minimized. Accordingly, it is not only to optimize the low power consumption but also to avoid causing abnormal conditions since the light drive signal Vd reduces to reach to the reset voltage Vreset. At the time point t14, the output control switch Qsw is controlled to be turned on by the control unit CONR, and therefore the voltage level of the light drive signal Vd is restored. At this condition, since the voltage level of the light drive signal Vd is greater than the low-level voltage Vlow, it is to leave the sleep mode and enter the work mode again in the next cycle.

FIG. 4 further shows the light drive signal Vd with a narrow-width cycle, for example but not limited to 1 microsecond. In comparison with the narrow-width cycle, a wide-width cycle between the time point t11 and the time point t14 is about 3 microseconds. The difference between the narrow-width cycle and the wide-width cycle is that the voltage level of the light drive signal Vd is restored before the time interval T has ended (i.e., before entering the sleep mode) in the former. At this condition, since the output control switch Qsw is controlled to be turned on by the control unit CONR, the voltage level of the light drive signal Vd is restored to enter the work mode again, thereby avoiding causing abnormal conditions since the light drive signal Vd reduces to reach to the reset voltage Vreset.

Figure 5:
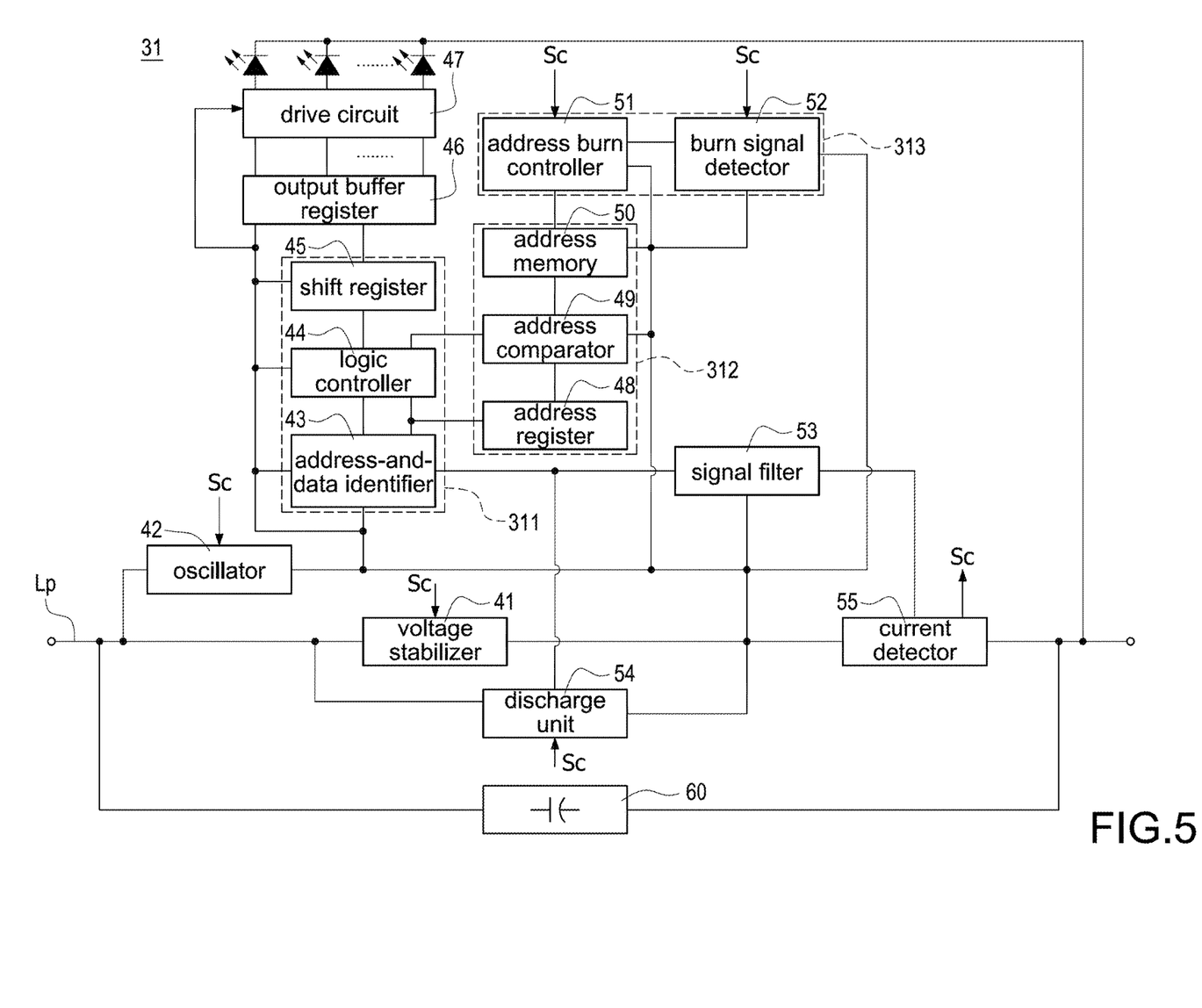
FIG. 5 is a block circuit diagram of an LED module according to a first embodiment of the present disclosure.

Please refer to FIG. 5, which shows a block circuit diagram of an LED module according to a first embodiment of the present disclosure. As mentioned above, since the LED light string 30 is a light string having data burning function, each of the LED modules 31, 32, . . . , 3n has own digital and analog circuits for burning light data and address data. For example, a light control unit 311 is responsible for controlling illumination, an address signal process unit 312 is responsible for processing address signal, and an addressing burn unit 313 is responsible for burning address. Take the LED module 31 shown in FIG. 5 for example, and the remaining LED modules 32, . . . , 3n have the same circuit topologies and will not be described again. The LED module 31, i.e., the LED light includes a voltage stabilizer 41, an oscillator 42, an address and data identifier 43, a logic controller 44, a shift register 45, an output buffer register 46, a drive circuit 47, an address register 48, an address comparator 49, an address memory 50, an address burn controller 51, a burn signal detector 52, a signal filter 53, a discharge unit 54, a current detector 55, and a latch unit 56.

The discharge unit 54 implements a function of discharging by turning on and turning off the power switch. The current detector 55 may be a voltage-dividing network for dividing the received voltage to detect the corresponding current value. By the way, the light control unit 311 includes the above-mentioned address and data identifier 43, logic controller 44, and shift register 45. The light control unit 311 drives the LEDs according to a light command content of the carry light signal. In particular, the light command content is specific identified encoded content corresponding to luminous behaviors of the LEDs, such as color change, light on/off manner, light on/off frequency, etc. The address signal process unit 312 includes the above-mentioned address register 48, address comparator 49, and address memory 50. The addressing burn unit 313 includes the above-mentioned address burn controller 51 and burn signal detector 52.

By the way, since the LED module 31 shown in FIG. 5 is applied to the in-series connection shown in FIG. 2A and FIG. 3A, the voltage stabilizer 41 is necessary for voltage regulation and voltage stabilization. If the LED module 31 is applied to the in-parallel connection shown in FIG. 2B and FIG. 3B, the voltage stabilizer 41 is unnecessary. The operations of the remaining circuits are the same in FIG. 5. Since the LED module 31 shown in FIG. 5 operates by a point control manner, the LED module 31 includes the address signal process unit 312 and the addressing burn unit 313 for processing (including determining, memorizing, burning, etc.) address data. That is, the address register 48, the address comparator 49, the address memory 50, the address burn controller 51, the burn signal detector 52 are involved. In other words, if the LED module 31 operates by a synchronous control, the address signal process unit 312 and the addressing burn unit 313 can be omitted, that is, only the light control unit 311 with processing light data is necessary.

In the above circuit, the difference in signal characteristics can be divided into analog circuits and digital circuits. The voltage stabilizer 41, the oscillator 42, the address burn controller 51, the burn signal detector 52, and the discharge unit 54 belong to the analog circuits, and others belong to the digital circuits. In different embodiments, however, the address burn controller 51 and the burn signal detector 52 may be implemented by both the analog circuit and the digital circuit. In comparison with the low power consumption of the digital circuits, the analog circuits, including the voltage stabilizer 41, the oscillator 42, the light control unit 311, the address signal process unit 312, the addressing burn unit 313, and the discharge unit 54 are the circuit components with relatively high power consumption of the LED module 31. Therefore, the features of the present disclosure focus on both effectively reducing the power consumption of the analog circuits in the eco mode and the sleep mode and normally operating the LED module 31, as explained below.

The voltage stabilizer 41 receives an input voltage and regulates and controls the received input voltage to provide a stable output voltage. The oscillator 42 produces a periodic clock signal as a time reference for the light control unit 311, the address signal process unit 312, and the addressing burn unit 313 normally and orderly operating. The address and data identifier 43 is coupled to the oscillator 42. The logic controller 44 is coupled to the address and data identifier 43. The shift register 45 is coupled to the logic controller 44. The output buffer register 46 is coupled to the shift register 45 and the drive circuit 47. The drive circuit 47 is coupled to a plurality of LEDs.

The address register 48 is coupled to the logic controller 44. The address comparator 49 is coupled to the logic controller 44 and the address register 48. The address memory 50 is coupled to the address comparator 49. The address burn controller 51 is coupled to the address memory 50. The burn signal detector 52 is coupled to the address memory 50 and the address burn controller 51. The signal filter 53 is coupled to the address and data identifier 43, the voltage stabilizer 41, and the oscillator 42.

The light drive signal Vd produced from the control circuit 20 is transmitted to the LED module 31, and then is filtered by the signal filter 53, and then is provided to the address and data identifier 43 for identifying. The address and data identifier 43 identifies out the address data and the light data of the light drive signal Vd, and then the address and data identifier 43 transmits the address data and the light data to the logic controller 44. The logic controller 44 transmits the address data to the address register 48. However, it is not limited to the present disclosure. The address data identified from the address and data identifier 43 may be transmitted to the address register 48 by the address and data identifier 43.

The address comparator 49 receives the address data of the address register 48, and also receives the local address data stored in the address memory 50. Afterward, the address data are compared with the local address data. If the address data are identical with the local address data, it means that the light data received by the logic controller 44 are the light control data of the LED module 31. At this condition, the address comparator 49 notifies the logic controller 44 to transmit the light data to the drive circuit 47 through the shift register 45 and the output buffer register 46 for driving the LEDs. On the contrary, if the address data are not identical with the local address data, it means that the light data received by the logic controller 44 are not the light control data of the LED module 31, but the light control data of any one of the LED modules 32, . . . , 3n.

When the burn signal detector 52 detects a burn start signal, the burn signal detector 52 notifies the address burn controller 51. At this condition, the address burn controller 51 starts to receive burn address data and then burns the burn address data into the address memory 50 so that the local address data are stored in the address memory 50.

Figure 6:
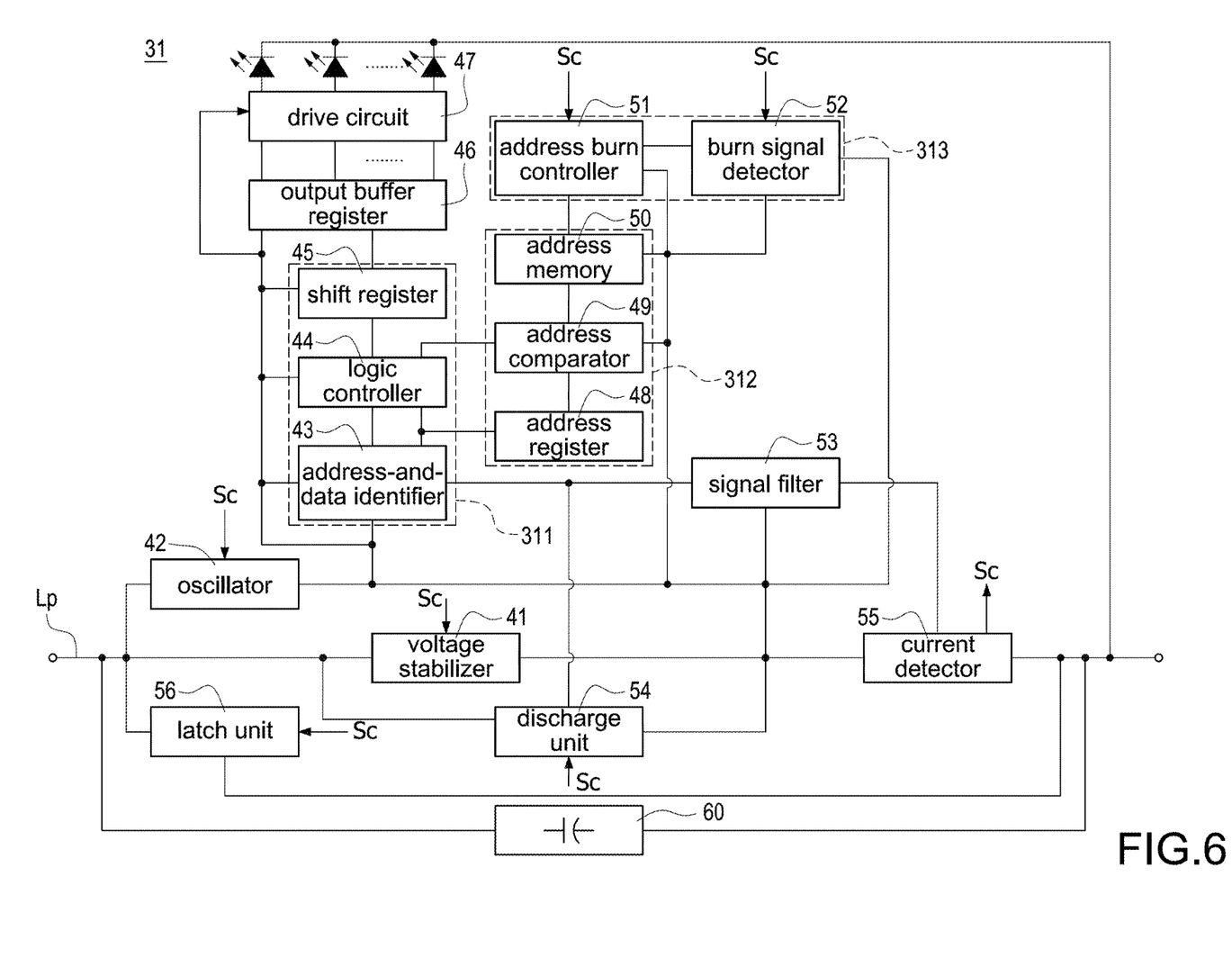
FIG. 6 is a block circuit diagram of the LED module according to a second embodiment of the present disclosure.

Please refer to FIG. 6, which shows a block circuit diagram of the LED module according to a second embodiment of the present disclosure. In comparison with the first embodiment shown in FIG. 5, the LED module 31 further includes a latch unit 56, the remaining circuits are the same in FIG. 5. The latch unit 56 is coupled between an input side and an output side inside the LED module 31. The latch unit 56 is used to replace the oscillator 42 in the sleep mode so that the LED module 31 can continuously perform the signal detection and signal recognition. In one embodiment, the latch unit 56 may be an analog charging and discharging circuit composed of a resistor and a capacitor.

Hereinafter, a description will be given of how the present disclosure achieves reducing power consumption and saving energy. Please refer to FIG. 4, when the light drive signal Vd reaches to the low-level voltage Vlow (at the time point t12 or time point t22 shown in FIG. 4), the current detector 55 produces the control signal Sc. At this condition, the analog circuit with relatively high power consumption of the LED module 31 such as the voltage stabilizer 41, the oscillator 42, the address burn controller 51, the burn signal detector 52, and the discharge unit 54 are controlled by the control signal Sc to enter the eco mode, thereby reducing the main source of power consumption. The eco mode can be regarded as a first stage control mode to reduce power consumption. However, since the operation of the digital circuits is closely related to the oscillator 42 and in order to ensure that the digital circuit can perform its necessary operation, the oscillator 42 is then controlled to enter to the sleep, which can be regarded as a second stage control mode to reduce power consumption. Specifically, two embodiments are proposed to reduce the power consumption of the oscillator 42 in the eco mode. The first one is that the oscillator 42 is controlled to be in an oscillation operation at low power without turning off, and the second one is that the oscillator 42 is replaced by the charging and discharging circuit.

Figure 7:
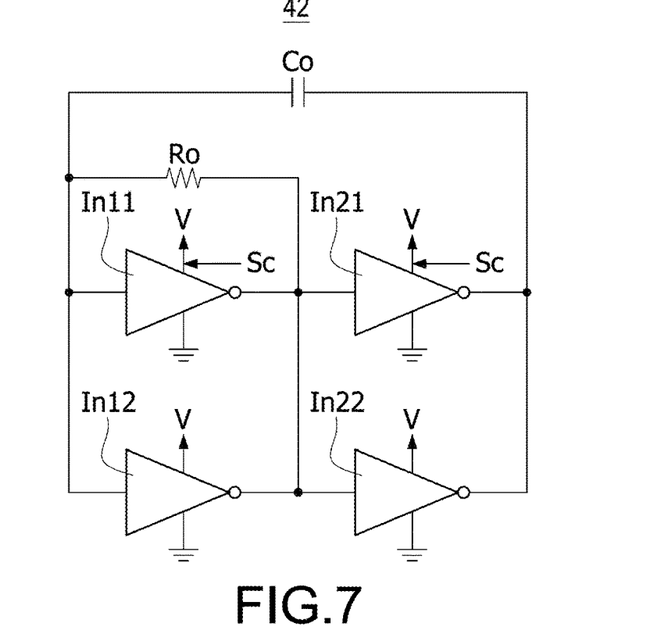
FIG. 7 is a schematic circuit diagram of an oscillator according to the present disclosure.

Please refer to FIG. 7, which shows a schematic circuit diagram of an oscillator according to the present disclosure, and also refer to FIG. 5. In terms of control accuracy, the best manner is to use the oscillator 42 to produce the periodic clock signal as the time reference. However, in order to have requirements of accurate control and low-power consumption, the specific design of the oscillator 42 is provided to implement the low-power oscillation in a first embodiment. The oscillator 42 shown in FIG. 7 includes a plurality of inverters In11-In22, a resistor Ro, and a capacitor Co. However, the connection thereof is for illustrative purposes only, and is not intended to limit the present disclosure. The inverters In11-In22 are CMOS transistor circuit inverters. The design of different transistor sizes and the control of enabling and disabling are implemented to achieve the accurate control and low power consumption. For example, but not limited to that the size of the inverter In12 and the size of the inverter In22 are smaller than that of the inverter In11 and that of the inverter In21, respectively. Further, the inverter In11 and the inverter In21 are controlled by the control signal Sc.

When the oscillator 42 normally operates, i.e., the LED module 31 is in the work mode (before the time point t12 shown in FIG. 4), the inverters In11-In22 are enabled. At this condition, the oscillator 42 operates at a full-power condition to provide a clock signal. When the light drive signal Vd reaches to the low-level voltage Vlow (at the time point t12 shown in FIG. 4), the control signal Sc produced from the current detector 55 controls the inverter In11 and the inverter In21 to be disabled, at this condition, the inverter In12 and the inverter In22 are still enabled. Alternatively, the inverter In12 and inverter In22 may be controlled by the control signal Sc to be disabled, but the inverter In11 and the inverter In21 are still enabled. Accordingly, the oscillator 42 can be controlled by the control signal Sc to be in an oscillation operation at low power, thereby ensuring that the digital circuit can perform its necessary operation and implementing the lower power consumption of the oscillator 42. Until the LED module 31 completes the signal detection and signal recognition within the time interval T between the time point t12 and the time point t13 shown in FIG. 4, the oscillator 42 is turned off to enter to the sleep mode after the time point t13. However, the connection relationship, the number, the size, and the signal control manner of the inverters In11-In22 are for illustrative purposes only and are not intended to limit the present disclosure.

Figure 8:
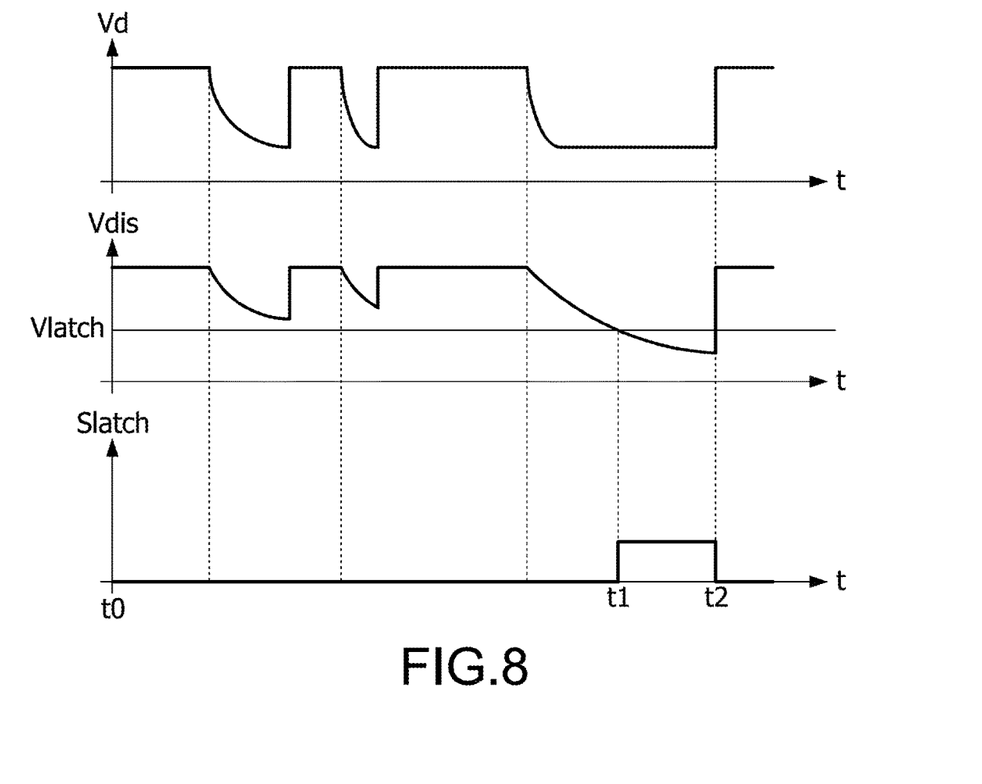
FIG. 8 is a schematic waveform of operating a latch unit according to the present disclosure.

Please refer to FIG. 8, which shows a schematic waveform of operating a latch unit according to the present disclosure, and also refer to FIG. 6. In order to respond the light drive signal Vd with wider width (for example but not limited to 6 to 8 microsecond) as a latch signal for ending the signal recognition, a latch unit 56 is provided as shown in FIG. 6. The latch unit 56 is used to make end the signal recognition being correct to avoid too early turning off the oscillator 42 to cause the digital circuits to be out of order and malfunction. Moreover, in order to early turn off the oscillator 42 with relatively high power consumption to achieve low power consumption, the latch unit 56 having charging and discharging functions is proposed by a resistor-capacitor charging and discharging circuit, thereby replacing the timing function of the oscillator 42. As mentioned above, for the light drive signal Vd with 3-microsecond or 1-microsecond cycle width (as shown in the first two cycle signals in FIG. 8). Since the first two cycle signals are not latching signals, a discharge voltage Vdis is greater than a predetermined latch voltage Vlatch, wherein the discharge voltage Vdis is provided by discharging operation through a capacitor of the latching unit 56. Alternatively, a charging operation of the capacitor of the latch unit 56 may be provided to achieve the similar determination. At this condition, a latch determine signal Slatch is low level, and the oscillator 42 can operate at low power in the eco mode and be turned off in the sleep mode, thereby implementing lower power consumption.

When the light drive signal Vd is the latching signal with 6-microsecond to 8-microsecond cycle width (as shown in the third cycle signal in FIG. 8), the discharge voltage Vdis is equal to or less than the latch voltage Vlatch at the time point t1 since the discharging time of the capacitor of the latch unit is longer. At this condition, that latch determine signal Slatch is transited from the low level to the high level. Moreover, by continuously discharging the capacitor of the latch unit 56, it is to ensure that the light drive signal Vd as the latching signal to be normally detected and controlled after the oscillator 42 is turned off. Until the time point t2, since the output control switch Qsw is controlled to be turned on by the control unit CONR, the voltage level of the light drive signal Vd is restored. At this condition, since the voltage level of the light drive signal Vd is greater than the low-level voltage Vlow, the latch determine signal Slatch is transited from the high level to the low level, and therefore it is to leave the sleep mode and enter the work mode again in the next cycle.

However, the detection and control of the latching signal are not limited by comparing the discharge voltage Vdis with the latch voltage Vlatch. Alternatively, a predetermined time length is set for latching operation of the latch unit 56. For example, the latch unit 56 may be implemented by a timing circuit. Therefore, when the predetermined time length reaches or exceeds, the latching operation of the latch unit 56 is activated to meet the requirement of low power consumption.

In conclusion, the present disclosure has following features and advantages:

1. In the same architecture, the light drive signal and the power supplying source are both transmitted to the LED light string.

2. The quick discharging circuit inside each of the LED modules is provided to quickly reduce the voltage level of the light drive signal to ensure that all in-series LEDs are completely controlled.

3. The simple application circuits are provided to solve determination abnormality and malfunction of the LED module since the light drive signal reduces to reach to the reset voltage.

4. It is to effectively reduce power consumption of the analogy circuits with relatively high power consumption and to make the LED module normally operate.

5. The LED module operates by the point control or by the synchronous control, and therefore to increase flexibility and convenience of designing the control circuit and implement diverse lighting effects and changes of the LED lamp.

6. The specific design of the oscillator is provided to implement the low-power oscillation, provide the clock signal, and ensure that the digital circuit can perform its necessary operation before the oscillator enters the sleep mode, thereby achieving the lower power consumption of the oscillator.

7. The charging and discharging time design and the predetermined time design of the latch unit ensure that the light drive signal as the latching signal to be normally detected and controlled, thereby achieving the lower power consumption of the oscillator.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. A carry-signal controlled LED light with low power consumption, comprising:
at least one LED, and
a drive unit coupled to the at least one LED, the drive unit configured to receive a carry light signal including a plurality of pulse waves to control the at least one LED, the drive unit comprising a light control unit and an oscillator coupled to the light control unit, and the light control unit configured to drive luminous behaviors of the at least one LED according to a light command content of the carry light signal, wherein the light command content is specific identified encoded content corresponding to the luminous behaviors,
wherein when a voltage of the carry light signal is less than a low-level voltage, the light control unit entering an eco mode, and the light control unit configured to detect and identify signals within a time interval,
wherein a time length of the time interval is a plurality of clock cycles; after the time interval, the light control unit entering a sleep mode, and
wherein in the eco mode, the oscillator is configured to receive a control signal, and the oscillator is controlled by the control signal to be in an oscillation operation at low power.

2. The carry-signal controlled LED light in claim 1, wherein before entering the sleep mode, the light control unit enters a work mode when the voltage of the carry light signal is greater than the low-level voltage.

3. The carry-signal controlled LED light in claim 1, wherein after entering the sleep mode, the light control unit leaves the sleep mode when the voltage of the carry light signal is greater than the low-level voltage.

4. The carry-signal controlled LED light in claim 1, wherein the drive unit further comprises:
a latch unit coupled between an input side and an output side inside the LED light, and
an oscillator coupled to the light control unit and the latch unit,
wherein in the eco mode, the latch unit and the oscillator are configured to receive a control signal, and the oscillator is controlled by the control signal to be disabled and the latch unit is controlled by the control signal to be in a timing operation.

5. The carry-signal controlled LED light in claim 4, wherein the drive unit further comprises:
a current detection unit coupled to the light control unit and configured to produce the control signal.

6. The carry-signal controlled LED light in claim 5, wherein the drive unit further comprises:
a discharge unit coupled to the current detection unit; when the discharge unit is configured to receive the carry light signal transmitted from the current detection unit, the discharge unit is configured to start to discharge a DC working power.

7. The carry-signal controlled LED light in claim 4, wherein the latch unit is a charging and discharging circuit with a resistor and a capacitor.

8. The carry-signal controlled LED light in claim 4, wherein the latch unit is a timing circuit.

9. The carry-signal controlled LED light in claim 4, wherein the drive unit further comprises:
a power capacitor coupled to the light control unit, the latch unit, and the at least one LED.

10. The carry-signal controlled LED light in claim 1, wherein the drive unit further comprises:
a current detection unit coupled to the light control unit and configured to produce the control signal.

11. The carry-signal controlled LED light in claim 10, wherein the drive unit further comprises:
a discharge unit coupled to the current detection unit; when the discharge unit is configured to receive the carry light signal transmitted from the current detection unit, the discharge unit is configured to start to discharge a DC working power.

12. The carry-signal controlled LED light in claim 1, wherein the drive unit further comprises:
an address signal process unit coupled to the light control unit and configured to memorize a light address, the address signal process unit is configured to receive an address signal transmitted from the light control unit and compare the address signal with the light address; when the address signal matches the light address, the light control unit drives the at least one LED according to the light command content of the carry light signal.

13. The carry-signal controlled LED light in claim 12, wherein the drive unit further comprises:

an address burn unit coupled to the address signal process unit, wherein the carry light signal includes a burn start signal and a burn address signal; when the address burn unit is configured to receive the burn start signal, the address burn unit is configured write the light address into the address signal process unit according to a burn command content of the burn address signal.

14. A carry-signal controlled LED light string, comprising:
a power line,
a controller coupled to the power line, and
at least one LED light, each LED light comprising:
  at least one LED, and
  a drive unit coupled to the at least one LED, the drive unit configured to receive a carry light signal including a plurality of pulse waves to control the at least one LED, the drive unit comprising a light control unit and an oscillator coupled to the light control unit, and the light control unit configured to drive luminous behaviors of the at least one LED according to a light command content of the carry light signal, wherein the light command content is specific identified encoded content corresponding to the luminous behaviors,
wherein when a voltage of the carry light signal is less than a low-level voltage, the light control unit entering an eco mode, and the light control unit configured to detect and identify signals within a time interval, wherein a time length of the time interval is a plurality of clock cycles; after the time interval, the light control unit entering a sleep mode,
wherein in the eco mode, the oscillator is configured to receive a control signal, and the oscillator is controlled by the control signal to be in an oscillation operation at low power, and
wherein the LED light is coupled to the controller through the power line, and is configured to receive the DC working power and the carry light signal transmitted from the controller through the power line.

15. The carry-signal controlled LED light string in claim 14, wherein the controller comprises:
a rectifier unit coupled to the power line and configured to provide the DC working power,
a switch coupled to the power line and the at least one LED light, and
a control unit coupled to the rectifier unit and the switch, wherein when the control unit is configured to turn on the switch, the DC working power forms a power supply loop for the LED light through the power line,
wherein when the control unit is configured to produce the carry light signal, the control unit is configured to continuously turn on and turn off the switch according to the light command content of the carry light signal so that the DC working power of the power line forms the plurality of pulse waves to be combined into the carry light signal, and transmit the carry light signal to the LED light through the power line.

16. The carry-signal controlled LED light string in claim 15, wherein the controller further comprises:
a discharge circuit coupled to the power line and the control unit,
wherein when the switch is turned off, the controller is configured to drive the discharge circuit to receive the DC working power and to start discharging the DC working power.

17. The carry-signal controlled LED light string in claim 15, wherein the controller further comprises:
a voltage adjust capacitor coupled to the power line,
wherein when the switch is turned off, the voltage adjust capacitor is configured to provide the DC working power to the at least one LED light.

* * * * *